May 24, 1938.    G. KEINATH    2,118,248

HYDRAULIC GOVERNOR

Filed Sept. 15, 1936

Inventor
Georg Keinath
by Knight Bros.
attorneys

UNITED STATES PATENT OFFICE 2,118,248

HYDRAULIC GOVERNOR

Georg Keinath, Berlin-Charlottenburg, Germany, assignor to Siemens & Halske, Aktiengesellschaft, Siemensstadt, near Berlin, Germany, a corporation of Germany Application September 15, 1936, Serial No. 100,876
In Germany September 28, 1935

5 Claims. (Cl. 236—84)

My invention relates to improvements in hydraulic governors controlled by electric measuring instruments.

It is well-known in the art to maintain an operating condition, such as a temperature prevailing in a furnace, measured with the aid of electric means at a constant or variable value by correspondingly adjusting a control member, for instance, a valve for the supply of the heating agent. As a rule, valves with a hydraulic drive by compressed air, oil under pressure or the like lend themselves particularly to a continuous control.

The design of such governors present great difficulties, since the regulating power or the torque of the electric measuring instruments hitherto employed is not sufficient to control a hydraulic governor in a sufficiently reliable manner.

These difficulties may be removed according to the invention by associating the movable system of a differential galvanometer with a hydraulic control device, one coil of the movable system being connected in series with a resistor varying automatically in accordance with the condition of the object to be controlled and the other coil of the movable system being series-connected with a resistor serving to adjust the desired value of control. As coupling member a strip or tape may be particularly employed which is connected, on the one hand, to the movable system of the differential galvanometer and on the other hand, to a lever or the like forming the actuating part of the hydraulic control device.

Figure 1:
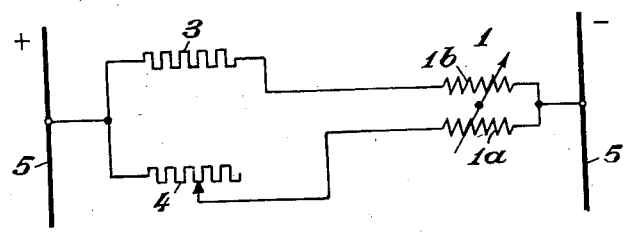
Figure 2:
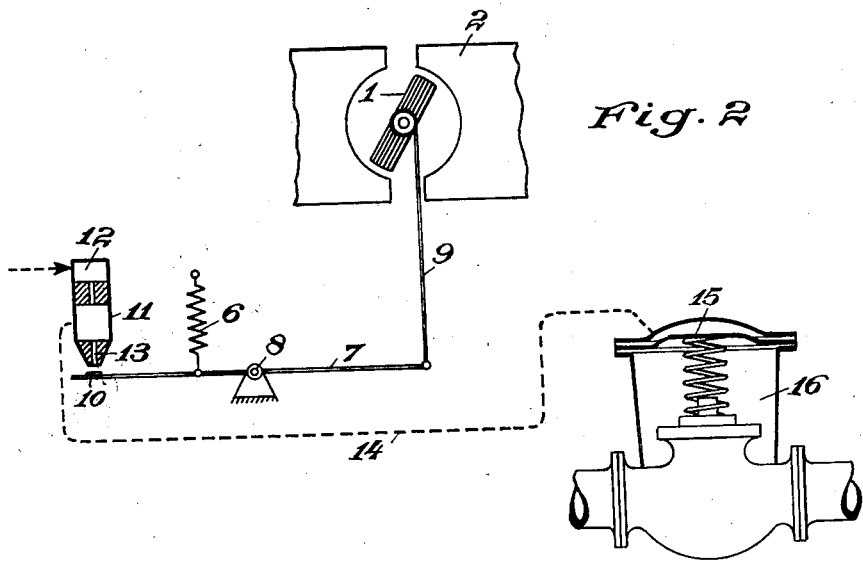

In the accompanying drawing is illustrated an embodiment of my invention in diagrammatic form, in which Fig. 1 shows the connection of the electric parts; Fig. 2 the connection of the differential galvanometer with the hydraulic control device and Fig. 3 a modified form of the electric connection according to Fig. 1.

According to Figs. 1 and 2 a differential galvanometer 1 is employed for the control of a hydraulic governor system, both coils 1a and 1b of the galvanometer being wound in such a manner that the winding planes coincide with each other. The coil system is rotatably mounted in the field of a strong permanent magnet 2. Each of the two coils 1a and 1b of the measuring instrument 1 is series-connected with a variable resistor 3 and 4 respectively lying in two circuits, connected to a direct-current source 5. The resistor 3 serves to continuously check up on or respond to the prevailing operating condition. If it is the case of controlling a temperature, the resistor 3 is designed in the form of a resistance thermometer. The resistor 4 may be regulated by hand and serves to adjust the desired operating condition to be maintained. If it is the case of regulating a temperature to a definite constant value the resistor may be adjusted either by hand to the desired value or by means of a clockwork, synchronous motor or the like.

Both coils 1a and 1b of the differential galvanometer 1 produce opposed torques. The instrument operates, consequently, in response to the difference of the ampere turns or in the case of an equal number of turns of both coils in response to the difference in the intensity of current. In order to secure the zero position an outer controlling force is necessary which in the embodiment according to the invention is given by a spring 6. The spring 6 is connected to a lever 7 which is pivotally mounted as indicated at 8. One end of the lever 7 is connected to the shaft of the differential galvanometer 1 through a small tape 9. At the other end of the lever is secured a small plate 10 which influences the hydraulic control member, for instance, a control throttle fed preferably with compressed air. The control throttle consists of the casing 11, the throttle 12 and the nozzle 13, the outlet of which is varied upon the movement of the lever 7 by the so-called impact plate 10. The control member 11 is connected by a hydraulic conduit 14 with a valve 16, which forms the actually controlling element of the governor system. In this case a variable pressure of the operating fluid is created in the space between the throttle 12 and the nozzle 13, the pressure acting on the diaphragm piston 15 of the valve 16 through the conduit 14, thereby adjusting upon the deflection of the lever 7 the valve in the desired manner. The spring 6 serves at the same time to secure the position of the lever 7. In the position shown in Fig. 2 the spring 6 presses the impact plate 10 of the lever 7 against the opening of the nozzle 13. The pressure exerted by the operating fluid, particularly compressed air, issuing from the nozzle 13 acts in opposite direction to the action of the spring 6 and decreases the control torque acting on the differential galvanometer 1.

The operation of the governor according to the invention as applied to the control of furnace temperatures is as follows:

If the furnace temperature which is measured with the aid of the resistance thermometer 3 coincides with the temperature adjusted at the resistor 4, the parts 1, 2 and 7–10 assume the position shown in Fig. 2; the governor is at rest. If a change in temperature occurs in the furnace the currents flowing in both coils 1a and 1b of the differential galvanometer differ from each other, thus causing the coil system to deflect. The impact plate 10 is moved away from the nozzle 13 or approaches the same, according to the difference in temperature prevailing in the furnace, by means of the parts 9, 7. The pressure of the operating fluid acting on the valve 16 is varied and adjusts the valve in the desired manner. If necessary, return motion control or check-back device (not shown) may be arranged on the governor in order to prevent an overregulation.

Tests have shown that a sufficiently great torque of the differential galvanometer is available already in the case of a very small change in temperature so that the control of the temperature may be effected very accurately. If desired, the sensitiveness of control may also be still increased by causing the control throttle to influence at first a hydraulic relay through which the control valve 16 is operated. The control valve 16 varies in this case in a manner well known the supply of the heating agent to the furnace.

In cases in which the range of the desired value should be adjusted within relatively wide limits the resistor 4 and, therefore, in the state of equilibrium of the governor also the resistor 3 varies considerably in accordance with the adjusted desired value of control. Accordingly, smaller currents flow in both coils 1a and 1b of the differential galvanometer at high temperatures than at lower temperatures. Thereby the sensitiveness of the governor at high temperatures is impaired in an undue manner, since a predetermined maximum current should not be exceeded in order to avoid an overstressing of the measuring instrument 1.

Figure 3:
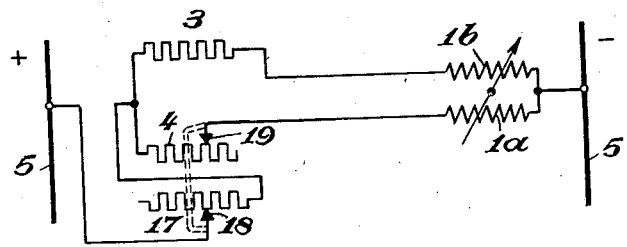

To remove the above disadvantages it is preferable to use for wide ranges of control the connection of the coils 1a and 1b of the differential galvanometer shown in Fig. 3. In this connection an additional resistance 17 is provided, the control member 18 of which is connected to the control member 19 of the resistor 4 as indicated in Fig. 3 by dotted lines. When adjusting resistor 4, the resistor 17 thus is adjusted simultaneously. The resistor 17 lies in the common current supply circuit leading to the two coils 1a and 1b so that upon the adjustment of the control members 18 and 19 the resistance of the resistor 17 varies inversely proportional to the resistance of the resistor 4. The resistor 17 is preferably so dimensioned that in the state of equilibrium of the governor the same current flows for all adjustments of the resistor 4, so that even at the maximum temperature which may be adjusted as the desired value of control also the permissible maximum current flows through the differential galvanometer, thus securing the desired sensitiveness of control also at high temperatures. This condition may be fulfilled in the following way. The current flowing within the circuit between the + and − lines 5 is, in case of Fig. 1, dependent upon the resultant resistance of the two resistors 3 and 4 of the two interposed branches of this circuit. If the resistor 4 is adjusted to its maximum value, the resultant resistance of the two branches 3 and 4 shows in balanced state of the arrangement a certain corresponding maximum value. Accordingly this resultant resistance has a certain minimum value corresponding to the minimum adjustment of resistor 4. In case of Fig. 3, the additional resistor can be so chosen that its maximum resistance is equal to the difference of the maximum values of the two above-mentioned resultant resistances of the two-branch part of the circuit between the + and − lines 5. It then is possible to attain the result that the resultant resistance of the three resistors 3, 4 and 17 and therefore the current flowing from the + to the − line remains practically constant at all possible adjustments of the resistor 4. The novel governor system is not limited to the temperature control but it may be, for instance, also employed for controlling a quantity. In this case it is only necessary to vary the resistor 3 automatically in accordance with the quantity of a liquid, gas or steam. The desired value of control is again adjusted at the resistor 4. This instance shows that the novel governor is also applicable to such cases in which no direct electrical measurement of operating magnitudes is involved, but any operating magnitudes otherwise measured are reproduced by an electric resistance. The governor according to the invention may be also employed for controlling the ratio of two magnitudes. For instance, when controlling boilers the novel governor may be used for controlling the quantity of fuel or air for combustion in accordance with the delivery of steam. In this case a suitable measuring instrument for the quantity of steam adjusts the resistor 4, whereas a measuring instrument for the fuel or the combustion air adjusts the resistor 3 so that the capacity of the furnace may be adapted to the delivery of steam. When controlling a gas mixture both resistors 4 and 3 may be, for instance, influenced by two quantity or pressure measuring instruments which are connected to both gas supply conduits, in one of which lies the valve.

I claim as my invention:

1. In a hydraulic governor system in combination a hydraulic arrangement for effecting a desired control, said arrangement having a hydraulic actuating member, a differential galvanometer having its movable two-coil system operatively connected with said actuating member, an electric circuit including a variable resistor series connected with one coil of said movable system for setting a predetermined value to be maintained by the governor system, and a second variable resistor series connected with the other coil of said movable system and disposed to be varied automatically in accordance with the condition of the object to be controlled.

2. In a hydraulic governor system in combination an operating element governing the condition of the object to be controlled, a device for controlling said operating element, said device being hydraulically connected with said element and having an actuating part and means for biasing said part so as to maintain a certain position, a differential galvanometer having its movable two-coil system mechanically connected with said part for counteracting said biasing means, an electric circuit including a variable resistor series connected with one coil of said movable system for setting a predetermined value to be maintained by the governor system, and a second variable resistor series connected with the other coil of said movable system and disposed to be varied automatically in accordance with the condition of the object to be controlled.

3. In a hydraulic system in combination an operating element governing the condition of the object to be controlled, a device for controlling said element, said device being hydraulically connected with said element and having an actuating lever and a spring tending to maintain a certain position of said lever, a differential galvanometer, a tape operatively connecting the movable two-coil system of said galvanometer for moving said lever in counteraction to said spring, an electric circuit including a variable resistor series connected with one coil of said movable system for setting a predetermined value to be maintained by the governor system, and a second variable resistor series connected with the other coil of said movable system and disposed to be varied automatically in accordance with the condition of the object to be controlled.

4. In a hydraulic governor system in combination a hydraulic arrangement for effecting a desired control, said arrangement having a hydraulic actuating member, a differential galvanometer having its movable two-coil system operatively connected with said actuating member, an electric circuit including a variable resistor series connected with one coil of said movable system for setting a predetermined value to be maintained by the governor system, a second variable resistor series connected with the other coil of said movable system and disposed to be varied automatically in accordance with the condition of the object to be controlled, and an additional resistor arranged in a common supply branch of said circuit so as to carry the sum of the currents flowing through both coils of said galvanometer, said additional resistor being variable in order to adjust the current which is biasing said galvanometer in the balanced state of the governor system.

5. In a hydraulic governor system in combination a hydraulic arrangement for effecting a desired control, said arrangement having a hydraulic actuating member, a differential galvanometer having its movable two-coil system operatively connected with said actuating member, an electric circuit including a variable resistor series connected with one coil of said movable system for setting a predetermined value to be maintained by the governor system, a second variable resistor series connected with the other coil of said movable system and disposed to be varied automatically in accordance with the condition of the object to be controlled, and an additional variable resistor arranged in said circuit so as to carry the sum of the currents flowing through both coils of said galvanometer, mechanical means operatively connecting said additional resistor with said first-mentioned resistor for simultaneously adjusting these two resistors, said additional resistor being disposed to vary its resistance reversely proportioned to the resistance of said first-mentioned resistor.

GEORG KEINATH.